United States Patent
van Beek

[11] Patent Number: 6,086,988
[45] Date of Patent: Jul. 11, 2000

[54] RECYCLABLE LIDDING MATERIAL FOR PUSH-THROUGH PACKAGING

[75] Inventor: Harry J. G. van Beek, Earlysville, Va.

[73] Assignee: Kloeckner Pentaplast of America, Inc., Gordonville, Va.

[21] Appl. No.: 09/046,055

[22] Filed: Mar. 23, 1998

[51] Int. Cl.⁷ .......................................... B32B 5/16
[52] U.S. Cl. .................. 428/330; 428/195; 428/331; 428/500; 428/903.3; 428/910
[58] Field of Search .................. 428/34.3, 200, 428/206, 225, 325, 411.1, 500, 518, 688, 195, 323, 402, 903.3, 910, 330, 331; 206/528, 531, 832

[56] References Cited

U.S. PATENT DOCUMENTS

| | | |
|---|---|---|
| 3,983,290 | 9/1976 | Elcik . |
| 4,429,792 | 2/1984 | Machbitz . |
| 4,528,235 | 7/1985 | Sacks et al. . |
| 4,618,528 | 10/1986 | Sacks et al. . |
| 4,696,857 | 9/1987 | Sibilia et al. . |
| 4,728,478 | 3/1988 | Sacks et al. . |
| 5,236,749 | 8/1993 | Ewing . |
| 5,484,631 | 1/1996 | Hoh . |
| 5,486,390 | 1/1996 | Burns et al. . |
| 5,522,506 | 6/1996 | Roulin et al. . |
| 5,578,372 | 11/1996 | Murakami . |
| 5,679,465 | 10/1997 | Bekele . |
| 5,686,156 | 11/1997 | Matsui et al. . |
| 5,932,338 | 8/1999 | Schnabele et al. ............... 428/323 |

FOREIGN PATENT DOCUMENTS

| | | | |
|---|---|---|---|
| WO 94/10229 | 5/1994 | Germany | ............... C08J 5/18 |
| 2542223 | 10/1996 | Japan . | |

Primary Examiner—Bruce Hess
Assistant Examiner—Michael E. Grendzynski
Attorney, Agent, or Firm—Peter E. Roaden

[57] ABSTRACT

A lidding material for use as a closure with a polyvinyl chloride (PVC) bottom in a push-through package is disclosed. The lidding material is totally recyclable with the bottom and has moisture vapor barrier characteristics which make it especially suitable for use in various industries where protection of stored products from environmentally based deterioration is desirable. The lidding material is comprised of a PVC base resin in a general purpose rigid PVC formulation bound together with two types of filler materials. The filler materials together regulate the frangibility of the lidding and enhance its moisture vapor barrier characteristic. In the preferred embodiment, for each 100 parts of base resin there are 50 parts of filler. In alternative embodiments, the amounts of fillers may be adjusted to vary the frangibility and other characteristics of the lidding.

9 Claims, 1 Drawing Sheet

RECYCLABLE LIDDING MATERIAL FOR PUSH-THROUGH PACKAGING

TECHNICAL FIELD

The subject invention relates generally to a frangible material used as a sealing cover for packages having one or more compartments. The material is particularly useful in pharmaceutical applications to permit users to store and access medical dosages held within the compartments of the package.

BACKGROUND OF THE INVENTION

Push-through packaging, also referred to as blister packaging, has applications in a variety of industries including the food and medical markets. But it is in the pharmaceutical area where metered provision to patients of ampules, tablets or capsules to patients provided in blister packs occurs that it has found its broadest application in the past. This type of packaging typically consists of a top lid stock, or lidding, applied to a thermoformed bottom often made from a polyvinyl chloride (PVC). Blister packages used in the pharmaceutical industry have particularly demanding requisites which the packaging industry has found difficult to meet concurrently in a single product formulation. These include the need to prevent package curling so that high volume cartoning can be accomplished faster and more easily and storage problems are minimized; the provision of simultaneous easy printability, sealability and machinability; the production of an effective, recyclable barrier for preventing moisture transmission; the facile disposition of trim from the product during manufacturing and after use through recycling and, finally, the attainment of a thin gauge material with the proper, desirable level of brittleness of the push-through lidding so that the physical effort required to access the packaged product is neither too great for the elderly nor too easy for children. In addition, the package must have a cosmetically pleasing appearance to consumers. Prior art packaging has experienced problems in meeting one or more of the recited goals due primarily to the composition of the lidding used for the particular package.

A widely used type of lidding relies on a metallic foil lid stock, often with an aluminum component. Such foils can provide an adequate moisture vapor barrier, a thin gauge material, eventual printability and the desirable push-through characteristics. However, such lidding also has the disadvantages of high cost, the necessity of treatment or surface coating to achieve printability, difficulties in recycling the entire package after use and curling of finished packages.

Another type of lidding is made from polyamide or polyethylene. Although such lid stock solves many of the problems listed above, its primary disadvantage is the difficulty encountered in recycling packages in which it is used.

A third choice involves blister packs with bottoms made from polyvinyl chloride (PVC) or polyethylene terephthalate and lidding composed of paper or card stock. Recycling such packages is complicated both by the absence of a satisfactory method of separating the lidding from the front blister and the tendency of fibers from the lidding to adhere partially to the front blister during removal.

Still another possibility has been the use of polypropylene lidding. Such packages are subject to curling, are difficult to work with and do not store well.

There exists, therefore, a need for a lid stock material which is completely recyclable with a PVC bottom both during manufacture and after use, cost effective, directly printable and curl resistant while retaining desirable push-through and moisture vapor characteristics in a thin gauge material.

SUMMARY OF THE INVENTION

The present invention relates to push-through packages. It has particular utility in the pharmaceutical industry for the packaging, storing and dispersal of medications although it may also be used in a variety of other fields such as the food industry and general retailing. The lid stock material disclosed is designed for use as a closure together with a bottom formed of polyvinyl chloride (PVC) or a material completely compatible with PVC. The lid stock material is totally recyclable with such a bottom so that both waste material generated during manufacturing and packages which have been used and discarded by ultimate purchasers can be reclaimed and recycled without unusual preparations or separation steps as have been required in the prior art. In addition, the lid stock material provides a moisture vapor barrier which enhances its functionality in safely packaging and storing products and protecting them from environmental deterioration due to undesirable exposure to moisture.

In the preferred embodiment of the invention, the lidding is comprised of a base resin of PVC or of a material chemically compatible with PVC embodied in a general purpose rigid PVC formulation together with two different filler materials which are bound to the base resin. Both of the filler materials are recyclable together with the base resin and the bottom. The first filler material regulates the initiation of tearing in the lid stock material, while the second filler material governs the brittleness of the lid stock material and completion of the tearing process. For each 100 parts by weight of base resin, approximately 50 parts by weight of filler materials are included in the lidding of which 10 parts are preferably of the first filler material type and 40 parts are preferably of the second filler material type. The particles used in the second filler material are generally plate-shaped. When subjected to uniaxial stretching during the manufacturing process, these particles provide the enhanced moisture vapor barrier characteristics of the lidding.

In an alternative embodiment of the lidding, the amount of each type of filler material used may be adjusted so as to effect a modification of the frangibility of the lidding. In this way, a package employing the lidding may be made more or less easily accessible as desired. In another embodiment of the lidding, the total amount of filler material may be increased or decreased so as to adjust the moisture vapor barrier characteristic of the lidding.

It is a primary objective of this invention to provide a lid stock material which is recyclable together with the package with which it is used without the need to separate different parts of the package.

An additional objective of this invention is to provide a lid stock material for use with a push-through package which is made from materials compatible with polyvinyl chloride for the purposes of recycling.

Another objective of this invention is to provide a lid stock material which employs two types of filler materials so as to enable adjustments in the properties of the lid stock by varying the levels of one or both of the filler materials.

It is a further objective of this invention to provide a lid stock material for use in a push-through package which is more cost effective than those known in the prior art.

It is yet another objective of this invention to provide a lid stock material which is directly printable.

It is still another objective of this invention to provide a lid stock material for use in a push-through package which is curl resistant.

Yet an additional objective of this invention is to provide a lid stock material which is highly resistant to moisture vapor transmission.

It is another objective of this invention to provide a lid stock material which is recyclable both as trim material produced during the manufacturing and packaging process or as part of a disposed package after use.

Another objective of this invention is to provide a lid stock material which has push-through characteristics which can be adjusted for use in packages suitable for the elderly, children or the general population.

A further objective of this invention is to avoid the disadvantages associated with the use of foil lid stock in packaging.

Yet another objective of this invention is to provide a lid stock material for use in a push-through package the use of which results in the safe, proper and efficient storage of consumable products such as pharmaceuticals and food.

Yet a further objective of this invention is to provide a lid stock material having a modifiable moisture vapor barrier characteristic which does not adversely impact its susceptibility to recycling.

BRIEF DESCRIPTION OF THE DRAWINGS

The foregoing and other objects, aspects and advantages of the invention will be better understood from the following detailed description of the invention with reference to the drawings, in which.

DESCRIPTION OF THE INVENTION

Figure 1:
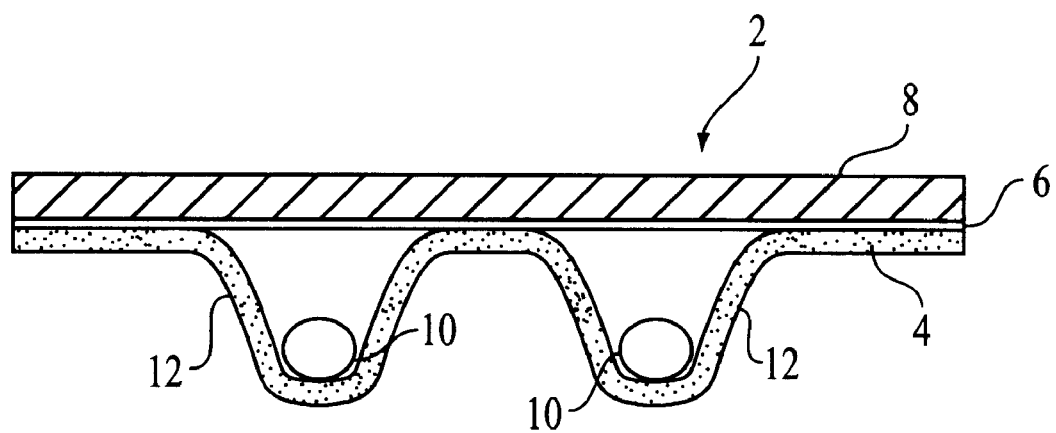
FIG. 1 is a cross-sectional view of a push-through package incorporating the lidding of this invention.

For a more detailed understanding of the invention, reference is first made to FIG. 1 of the drawings. This figure illustrates a cross-sectional view of a push-through package 2 having a thermoformed bottom 4. Heat seal coat 6 is applied to the novel, single polymer lidding 8 of this invention which may then be joined to bottom 4 as a closure so that heat seal coat 6 is in direct contact with bottom 4. Thermoformed bottom 4 is composed of rigid polyvinyl chloride (PVC) or of a material totally compatible with PVC. The use of this material for this purpose is important since, as will be explained below, it is both physically compatible and totally recyclable with the material comprising lidding 8. Heat seal coat 6 may be comprised of a heat-activated adhesive. After application of heat seal coat 6, lidding 8 is applied directly to bottom 4 where it may be attached by means of a heat-activated adhesive or polymer. Pills 10 may be placed into the compartments 12 formed in bottom 4 during the manufacturing and packaging process before lidding 8 is applied to close the package. Two advantages of novel lidding 8 are that its use facilitates the safe, proper and efficient storage of both pills 10 and a plurality of packages 2 and that it provides easy recyclability of trim waste generated during manufacturing of used packages 2.

These objectives are achieved in lidding 8 by formulating it so as to produce a material based on a PVC resin having both a high level of filler material which is physically compatible with PVC, thereby assisting recyclability, and a specified molecular orientation of parts of that filler material within the lidding compound to boost the vapor barrier properties of the lidding. Lidding 8 may be formed to a custom thickness and width based on the preference of its end user.

The primary element of lidding 8 in the preferred embodiment is a polyvinyl chloride (PVC) base resin material. This material is embodied in a general purpose rigid PVC formulation of which many varieties are known in the industry. Fillers are added to this formulation. Two types of filler, each of which perform a unique function, are included in the formulation. The first filler may be calcium carbonate. This is a relatively coarse material which, due to the generally large size of the particles, regulates the initiation of tearing in lidding 8 when force is exerted on an item such as pill 10 against lidding 8. This filler is physically compatible with PVC and can be rapidly dispersed throughout a PVC resin base. The first filler particles used in the preferred embodiment are irregularly shaped but, due to their crystallinity, their shapes tend towards cubic and rhombohedral forms typically having an equivalent surface area of 1.24 with reference to a sphere. The typical shape ratios of length, width and thickness of the particles in the first filler are approximately 1.0, while the approximate mean diameter of each particle is 3 microns. The particles typically range in diameter from 1 to 15 microns. For each 100 parts by weight of the PVC resin used in the general formulation, between 5 and 15 parts by weight of the first filler may be included, although inclusion of 10 parts by weight is preferable. The second filler may be magnesium silicate hydrate, or talc. The function of this filler is two-fold. First, it regulates the brittleness of lidding 8 and, hence, the force necessary to complete the push-through, tearing process to obtain access to pills 10. The use of talc gives lidding 8 paper-like properties. Second, as described below, it establishes in large part the moisture vapor barrier characteristics of lidding 8. This filler is also physically compatible with PVC and can be rapidly dispersed throughout a PVC resin base. The second filler particles used in the preferred embodiment are generally plate-shaped, each particle having a typical mean diameter of approximately 1.3 microns. The aspect ratio (diameter vs. thickness) for this talc ranges from 20:1 to 6:1. For the median-sized particle, therefore, the thickness may range from 0.05 to 0.2 microns. For each 100 parts by weight of the PVC resin used in the general formulation, between 25 and 55 parts by weight of the second filler may be included, although inclusion of 40 parts by weight is preferable. Thus, in the preferred embodiment a relatively constant total of 50 parts by weight of fillers per 100 parts by weight of base resin are used with the amount of each of the first and second filler comprising that total subject to some small possible variation.

These particular fillers were chosen for use in lidding 8 since they are capable of being broken down and homogeneously distributed inside the PVC resin, producing a homogeneous physical mixture, the components of which are physically compatible with each other. Thus, when used in a lidding which is bonded or otherwise attached to thermoformed PVC bottom 4, a totally recyclable package results. In addition to the recyclability enhancement already discussed, use of these fillers provide other advantages.

The amount of each filler used in the formula controls the force needed to access the contents of a push-through package employing lidding 8. Thus, for example, by controlling the balance between these amounts, the preferred embodiment enables an elderly person to obtain access to medication stored in compartment 12, while, at the same time, reducing the likelihood that a child will improperly and undesirably cause an item to be ejected from compartment 12. Furthermore, by using two fillers it is possible to change the balance between the fillers while retaining their respective total weight ratio in the compound formula as a relative constant so as to increase or decrease the force necessary to access the contents of compartment 12 for custom applications of lidding 8. This can be accomplished without loosing either the recyclability or moisture barrier characteristics of the film (explained below) while maintaining the thickness of the film at a relatively uniform level. As a result, functional flexibility is retained and the manufacturing process is simplified. The first and second fillers discussed above were found to be superior to other filler choices in providing the necessary processing characteristics and functional advantages discussed throughout this disclosure. Moreover, the chosen fillers are relatively inexpensive and are unobjectionable when placed in products which will have direct physical contact with other products designated for human consumption.

Due to the high level of fillers being used with the PVC base resin in lidding 8, it has been found helpful to use a coupling agent to bind the fillers with the base resin. An appropriate coupling agent for performing this function may be selected from the those in the alkaline metal type silicates, preferably sodium aluminosilicate hydrate.

The following table lists the typical physical properties of lidding 8 when formulated according to the preferred embodiment. These properties are at least comparable, and in some areas superior, to lid stock of the prior art.

TABLE 1

| Characteristic | Lidding physical property |
| --- | --- |
| Gauge Range | 2–6 mils |
| Specific Gravity | 1.58 |
| Yield (2 mils) | 8759 square inches/lb |
| Moisture vapor transmission rate | .45 g/100 sq. in/24 hrs/38 degree C/90% RH |
| Tensile Strength | 9040 psi |
| Elongation to Breakage | 2.8% |
| Gloss (20 degrees) | 6% |
| Bond Strength (to PVC) | 8 Newtons/15 mm |

The compound of the preferred embodiment may be transformed into lidding through the following steps. First, the compound may be extruded through a die to produce a melt after which it may be rolled through a calender in order to obtain a desired thickness. The extruded product is then subjected to uniaxial stretching in the direction of the machine. The stretching process causes the primary plane of the filler particles to align themselves with the primary plane of the extruded compound. The resulting molecular alignment decreases the moisture vapor transmission rate of the lidding product making it more suitable for the medical and food industry uses described elsewhere.

The lid stock of this invention provides a combination of advantages in at least five distinct areas which other products have had difficulty in obtaining. First, the entire product is reclaimable. Efforts to recycle push-through packages have generally been limited to recycling either only the front blister portion of the package or the entire package but with materials other than PVC. For example, a recyclable blister pack composed only of polyethylene terephthalate and polyethylene is known. In the present invention, recyclability of the entire product is achieved by using a high loading of filler products which are physically compatible with the base resin PVC in the lidding. As a result, both bottom 4 and lidding 8 can be treated as PVC materials and may be recycled together thereby avoiding the separation of materials and unrecyclability problems of push-through packages of the prior art. This type of problem is encountered, for example, with lidding that combines plastic and aluminum which must be separated and disposed of separately. The types of materials used for heat seal coat 6 also lend themselves to recycling with other PVC-compatible products. This means that both trim material generated during manufacturing and used packages disposed of by consumers are reclaimable. Furthermore, this development extends the type of product with which the lidding may be used. For instance, manufacturers of hardened or coated chewing gum and breathe savers have relied primarily on foil lid stock in the past making recycling of complete packages difficult. Lidding 8 solves this problem thereby adding food grade products to its useful market. In addition, whenever a consumer product company uses machinery for in-line sealing of lid stock to a prefilled thermoformed bottom web, lidding 8 is a prospective beneficial packaging element. Thus, its use can be further expanded to include such areas as cosmetics, batteries and personal care products.

Second, package curling is virtually eliminated since PVC-based lidding retains its rigidity and flatness. By contrast, curling is a significant problem with many other lid stocks such as those using foil and polypropylene. Moreover, packages using polypropylene lid stock are difficult to work with and do not store well.

Third, printing is facilitated by the lid stock of this invention. Often, it is desirable to print information such as advertising, product identification or patient instructions regarding frequency of use or dosage on the blister pack. Due to the formulation of lidding 8, it can directly accept vinyl-based inks which are broadly used in the printing industry. This contrasts with foil lid stock which requires an additional treating step or a special coating before the surface can accept printing ink. Thus, the lid stock of this invention permits the manufacturer to achieve both cost and operational efficiency in printing and enables printing on either or both of lid stock 8 and bottom 4 without special differentiating equipment.

Fourth, lid stock 8 has desirable push-through and product protective characteristics which have been difficult to achieve with other materials. If a paper lidding material is used, the contents may not be sufficiently protected from accidental contamination or damage. Moreover, recycling problems, as discussed above, arise. A composite foil lidding, i.e. a combination of metallic and synthetic materials, can solve some of these problems but can also prove too strong to permit the easy extrusion of delicate medicines without damage. By weakening the composite foil lidding with perforations, the vapor barrier properties of the package may be compromised even if a plastic covering is used with the foil. A simple aluminum foil lidding is relatively inelastic and can be manufactured at a sufficiently small thickness that the pressure needed to push through the foil is acceptable without facing the risk of damage to the contents as with a composite foil but recycling becomes problematic due to the required separation of materials. However, the combination of fillers used in lidding 8 provides control over the frangibility of the product so that its contents are neither too difficult for the elderly nor too easy for children to access. Furthermore, as the gauge range shown in Table 1 makes clear, lidding 8 has the additional advantage that its gauge can vary from approximately 2 mm to 6 mm, thereby enabling it not only to match the material thickness provided by foil for a like frangibility but also the flexibility to be used in various types of products in which greater resistance to tearing is desirable. In addition, the frangibility level of lidding 8 may be established at a level such that when pressure is exerted on pills 10 in compartments 12 the pills will push through the lidding rather than themselves fracture. Moreover, the frangibility level of lidding 8 is adjustable by varying the amount of filler used in the compound to increase and decrease the pressure required to push through the lidding depending on the requirements of the product stored in compartments 12 and the physical strength and security requirements of the target market for the product to be stored within package 2.

A final important feature of lidding 8 is its moisture vapor barrier characteristic. One of the advantages of a foil-type lidding in a push-through package is the resultant high water vapor barrier characteristics which can be achieved. A difficulty with lidding films not made from metallic foil has been in obtaining an optimal combination of the features discussed above and, in particular, to manufacture a nonfoil-type lidding which has a sufficiently low water vapor transmission rate that contents sensitive to moisture will not change their properties when sealed in such a package. It has been especially problematic to achieve both a high resistance to gas and moisture transmission together with a recyclable product in a thin lidding of the type used for packaging food and drug products. It is known that the gas and vapor diffusion rate of a film or laminated lidding made with thin polymeric films, such as polyamide or polyethylene, can be reduced by the addition of mineral particles as fillers to the film and by homogeneous molecular orientation of those fillers throughout the film. However, this type of molecular orientation of filler particles has not been applied to dispersion in a PVC base resin used in a totally recyclable push-through package of the type disclosed in this invention. Although a barrier with a low moisture vapor transmission rate is created by the lidding of the preferred embodiment of this invention which is in itself adequate for use in the medical and food industries, it is possible to enhance the moisture vapor barrier characteristics of package 2. For this purpose, a barrier coating may be applied to one or both of the exterior portions of bottom 4 and lidding 8. Such a barrier coating may be comprised of any of a variety of materials including vinyl, polyvinyldine chloride and ACLAR®-laminated vinyl. ACLAR is a registered trademark of Allied-Signal, Inc.

In an alternative embodiment of this invention, the total amount of filler used in the compound may be adjusted. By increasing the total amount of fillers, resistance to tearing is decreased while the moisture vapor transmission resistance characteristic of the lidding is simultaneously increased. Conversely, by decreasing the amount of filler, tearing is made more difficult and moisture vapor transmission resistance is decreased. This is an advantageous discovery since prior to this invention, these two factors were generally controlled, respectively, by increasing or decreasing the thickness or gauge of the final product film. If the same result can be achieved by simply adjusting the total filler level, then the manufacturing process is simplified and shipping of final product is more cost effective due to standardization.

Although various elements in the previously described embodiments of this invention have been disclosed with reference to particular types of materials, it should be understood that the functions performed by these materials may also be performed in appropriate cases by other types of materials and that this invention is not limited by reference to the specific materials disclosed. Furthermore, the embodiments described above are not to be construed as the only possible implementations of this invention. Other embodiments are possible so long as the functions described above are properly performed.

What is claimed is:

1. A recyclable, curl-resistant lid stock material for use in a push-through package together with polyvinyl chloride comprised of:
   a base resin of polyvinyl chloride used in a general purpose rigid PVC formulation;
   a first filler of calcium carbonate for regulating the initiation of tearing in the lid stock material wherein for each 100 parts by weight of said base resin there are between 5 and 15 parts by weight of said first filler and wherein the particles comprising said first filler have a homogeneous molecular orientation throughout the lid stock material;
   a second filler of magnesium silicate hydrate having plate-shaped particles for regulating the brittleness and the completion of tearing in the lid stock material and for enhancing the moisture vapor barrier characteristic of the lid stock material wherein for each 100 parts by weight of said base resin there are between 25 and 55 parts by weight of said second filler and wherein the particles comprising said second filler have a homogeneous molecular orientation throughout the lid stock material; and wherein said first filler and said second filler are recyclable with said base resin.

2. The lid stock material of claim 1, wherein said first filler is further comprised of particles having a generally rhombohedral shape.

3. The lid stock material of claim 2, wherein the approximate mean diameter of particles comprising said first filler is 3 microns.

4. The lid stock material of claim 1 wherein for each 100 parts by weight of said base resin there are 10 parts by weight of said first filler.

5. The lid stock material of claim 1, wherein the plate-shaped particles of said second filler have a typical mean diameter of approximately 1.3 microns.

6. The lid stock material of claim 1 wherein for each 100 parts by weight of said base resin there are 40 parts by weight of said second filler.

7. The lid stock material of claim 1, wherein vinyl-based inks may be applied directly to and retained thereon.

8. A recyclable, tearable lid stock material for use in a push-through package comprised of a base resin of PVC used in a general purpose rigid PVC formulation and two filler materials each having a homogeneous molecular orientation and each having particles with a mean diameter of less than 5 microns, wherein for each 100 parts by weight of said base resin there are approximately 50 parts by weight of both of said filler materials of which between 5 and 15 parts by weight comprise a first filler of calcium carbonate for regulating the initiation of tearing and between 25 and 55 parts by weight comprise a second filler of magnesium silicate hydrate for governing the brittleness of the lid stock material and completion of the tearing process and wherein the force needed to initiate and complete tearing is adjustable by varying the overall percentage of both filler materials.

9. A recyclable lid stock material having a moisture vapor barrier characteristic for use in a push-through package comprised of a base resin of PVC used in a general purpose rigid PVC formulation and two filler materials both of which have a homogeneous molecular orientation and at least one of which contains plate-shaped particles the primary plane of each of which is aligned with the primary plane of the lid stock material wherein for each 100 parts by weigh of said base resin approximately 50 pads by weight of said filler materials is used and wherein the moisture vapor barrier characteristics of the lid stock material is adjustable by varying the overall weight of the fillers.

* * * * *

UNITED STATES PATENT AND TRADEMARK OFFICE
CERTIFICATE OF CORRECTION

PATENT NO. : 6,086,988
DATED : July 11, 2000
INVENTOR(S) : Harry J. G. van Beek

It is certified that error appears in the above-identified patent and that said Letters Patent is hereby corrected as shown below:

On the Title page, the attorney's name should read -- Peter E. Rosden --.
In column 10, line 25, "weigh" should read -- weight --.
In column 10, line 26, "pads" should read -- parts --.

Signed and Sealed this

Twenty-second Day of May, 2001

*Attest:*

NICHOLAS P. GODICI

*Attesting Officer*   *Acting Director of the United States Patent and Trademark Office*